US005762738A

United States Patent [19]

Lafond

[11] Patent Number: 5,762,738

[45] Date of Patent: Jun. 9, 1998

[54] METHOD AND APPARATUS FOR APPLYING SEALANT MATERIAL IN AN INSULATED GLASS ASSEMBLY

[76] Inventor: Luc Lafond, 23 Woodvalley Drive, Etobicoke, Ontario, Canada, M9A 4H4

[21] Appl. No.: 694,666

[22] Filed: Aug. 9, 1996

Related U.S. Application Data

[63] Continuation-in-part of Ser. No. 513,179, Aug. 9, 1995.

[51] Int. Cl.[6] .................................................... C03C 27/10

[52] U.S. Cl. .................... 156/107; 156/109; 156/244.22; 156/575

[58] Field of Search .................................... 156/102, 107, 156/109, 244.22, 292, 500, 575, 578; 264/261

[56] References Cited

U.S. PATENT DOCUMENTS 4,826,547 5/1989 Lenhardt ................................ 156/109

*Primary Examiner*—Michael W. Ball
*Assistant Examiner*—Michael A. Tolin
*Attorney, Agent, or Firm*—Ian Fincham

[57] ABSTRACT

There is disclosed a method and apparatus for applying sealant material to the void in the perimeter between spaced-apart substrates in an insulated glass assembly. An apparatus includes a traveling applicator head and a stationary head, both applicator heads including a nozzle member and independently movable wiper member which cooperate to apply a smooth and even layer of sealant material. An advantage of the cooperating nozzle and wiper members is the ability to mold corners and to apply sealant material without lifting the applicator from the glass assembly. The method is sequential and employs two cooperating applicator heads, conveyors and position sensors to permit fully or semi-automated operation. The smoothing plates move in concert with the extrusion nozzles to ensure uniform distribution of the sealant material from the spacer, and a uniform and planar surface at the perimeter. The method of operation is automated and accordingly, the sealant can be applied in an expedited manner with a high degree of precision and uniformity.

18 Claims, 8 Drawing Sheets

METHOD AND APPARATUS FOR APPLYING SEALANT MATERIAL IN AN INSULATED GLASS ASSEMBLY

This application is a continuation-in-part application of U.S. application Ser. No. 08/513,179, filed Aug. 9, 1995.

Although embodiments of the invention have been described above, it is not limited thereto and it will be apparent to those skilled in the art that numerous modifications form part of the present invention insofar as they do not depart from the spirit, nature and scope of the claimed and described invention.

FIELD OF THE INVENTION

The present invention relates to an apparatus and method for the application of sealant material to a substrate, and more particularly, the present invention relates to a method of applying sealant between spaced-apart substrates in an insulated glass assembly and an apparatus therefor.

BACKGROUND OF THE INVENTION

The application of adhesive or other sealant material to substrates is well known and is particularly well known in the insulated glass assembly art. The glass assemblies include two or more panes joined by an insulating spacer around the perimeter. A small gap between the edges of the glass and the spacer is filled with a sealant material to provide a secure seal. A commonly used sealant is hot extruded butyl, although many other thermoplastic and thermosetting materials can be used. In the insulated glass art, it is important to ensure that the perimeter of a unit is completely sealed. If this is not ensured, the result is the ingress of moisture or debris which eventually leads to the premature degradation of the insulated assembly. Sealant must fill the groove between the substrates and the spacer completely achieving good contact with all three surfaces. Air pockets will cause an incomplete seal which may fail.

In view of this difficulty, the art has proposed numerous methods and various apparatus to ensure uniform application of sealant material in the assemblies. Typical of the known arrangements is extrusion heads which are either automated or manual. One of the primary difficulties of the known arrangements is that the depth of the sealant material cannot be uniformly applied in width or depth about the perimeter and further, the known arrangements are limited in that they do not positively avoid entrapment of air within the sealant material. A further limitation is that the finished surface of the sealant about the perimeter is not smooth and perpendicular relative to the substrate surface. The result of this is surface irregularity about the perimeter which must often be scraped and finished by hand to achieve a smooth planar finish which is more desirable from an aesthetic as well as a structural point of view.

Different prior art apparatus for applying sealant have proposed a single extrusion head dependent on manual or automatic rotation of the glass assembly, such as No. 4,234,372 issued to Bernhard in 1980. Alternatively, multiple heads are proposed, as many as four in U.S. Pat. No. 4,088,522 issued to Mercier in 1978, where sealant is applied to two opposite sides, the glass assembly is then rotated and advanced to two more extrusion heads where the other sides are sealed. These methods incorporate a delay between applying sealant to each side which is particularly significant if a thermoplastic sealant is used. Delay allows for cooling of the applied sealant and a cold joint, usually at the corners, where the next sealant is added. The cold joint is weaker and increases the likelihood that air pockets or incomplete seals will be formed.

Another flaw introduced by prior art devices in the sealing of insulated glass assemblies results from lifting and rotating the extrusion head or the glass assembly around corners, as the sealant is extruded, as in Bernhard above. This pulls and stretches the string of sealant causing the sealant to pull away from the glass and poor seal in the corner area. In addition, lifting the head requires repositioning in which a slight margin of error may cause damage to glass substrates.

U.S. Pat. No. 4,826,547, issued in 1989 to Lenhardt discloses an apparatus having two heads for applying sealant between two spaced apart glass lites which is adapted to apply sealant while the head or glass is stationary, in order to fill deep corners, as well as in motion. The apparatus includes a covering and stripping plate associated with the nozzle head, for closing the open edge at the corner area to ensure complete fill. At the same time the covering and stripping plate is positioned, the nozzle stops the flow of sealant and lifts to rotate around the corner. Once the corner area is completed, the plate is drawn away perpendicularly to the plane of the glass. As the head continues to travel, the covering and stripping plate is suspended a transverse distance from the nozzle. This prior art configuration has significant disadvantages. Each time the nozzle or the covering plate is lifted above the sealant surface, hairs or strings of the highly viscous sealant material will be formed which are likely to adhere to and mar the surfaces of the assembly. Further only the corner areas are smoothed by the covering and stripping plate, so that sealant intermediate the corners is not smoothed or forced to fill the gap without air pockets. As in other prior art designs, hand finishing is likely to be necessary.

In view of the existing limitations in the sealant applying art, there exists a need for an improved method of disposing sealant between, insulated glass assemblies and an apparatus to apply sealant according to the improved method.

SUMMARY OF THE INVENTION

It is one object of the present invention to provide an improved process of disposing sealant material between spaced-apart substrates and apparatus therefor.

Another object of the present invention, according to one embodiment thereof, is to provide a method of applying sealant material to the perimeter of a substrate or substrate assembly, said substrate having a pair of opposed lateral sides and a pair of transverse sides, comprising the steps of:

- providing applying means at a start position for applying sealant material to the perimeter of said substrate;
- providing wiping means in cooperation with said applying means for smoothing applied sealant material;
- advancing said applying means from a starting position to a distal position to apply sealant material at a first transverse side and smoothing said applied sealant;
- advancing said substrate;
- applying sealant material to each said lateral side simultaneously during movement of said substrates and smoothing said applied sealant; and
- reversibly advancing said applying means from said distal position to said start position while applying sealant material to said second transverse side and smoothing said applied sealant.

In a particularly preferred embodiment of the method of the present invention, the applying and smoothing steps are performed in concert, the sealant material being smoothed immediately after application. Further the preferred method includes employing the applying and wiping means to cooperate in forming a molded sealant loaded corner.

A further object of the present invention is to provide an automated apparatus for applying sealant material to the perimeter of a substrate or an insulated glass assembly comprising:

an infeed conveyor for advancing an assembly into an application station;

the application station comprising:

a travelling applicator head movable on a linear path including a nozzle member for injecting sealant material into three adjacent sides of the perimeter of the assembly, and a cooperating wiper member adjacent the nozzle for smoothing the applied sealant about the perimeter of the assembly, the nozzle member and the wiper member each independently movable in relation to the other in both the transverse and lateral directions in order to assume different configurations of position; and a stationary applicator head including a nozzle member for injecting sealant material into one side of the perimeter of the assembly and cooperating wiper member adjacent the nozzle, the nozzle member and the wiper member each independently movable in relation to the other between an operative position and an inoperative position;

material feed for independently supplying sealant material to each applicator head; and an outfeed conveyor for removing the finished assembly from the application station.

It has been found that precise application of the sealant with uniformity about the perimeter of the insulated assembly can be achieved by making use of the automated system according to the present invention. The uniform application is important in assemblies having gas charged or vacuum atmospheres as well as for structural and aesthetic considerations. The present method ensures integral contact of the sealant with the substrate.

In a particularly preferred form, the wiper members and extrusion heads will be disposed in a vertically arranged apparatus so that the application procedure can be achieved from an overhead attitude.

An attendant advantage to the method according to one embodiment of the invention is the provision of automatically applying the sealant in a sequential operation to ensure application of the sealant in a continuous manner about the perimeter. This makes fully automated operation possible, significantly increasing the potential productivity over previously practiced methods. Of course, the automated apparatus can be operated step-wise in a semi-automated function with manual intervention.

The use of a nozzle block on the traveling applicator head which has selectable orifices in different orientations eliminates the need to rotate the head, as a result the nozzle stays in contact with the substrate or assembly. Further, as the selection to the appropriate orifice is made at the corner area, supply of the sealant material is cut off and the sealant is therefore not stretched around the corner.

Conveniently, the use of "smoothing" or wiping members also a block shape associated with the nozzle members has a dramatic effect on the uniformity and smoothness of the outer surface of the sealant, as well as providing better fill without air pockets in the spaced perimeter. Preferably, the nozzle and wiper members are provided with a profile which fits between spaced apart substrates and contacts only the sealant material without touching the glass.

Further, in view of the fact that the injection members and wiping/smoothing members comprise a cooperative unit, a high quality result is attainable in an expedited manner. As an extrusion nozzle approaches a corner area, the channel to be filled is no longer enclosed on all sides. The open edge makes the controlled fill rate an ineffective measure, and without a wiper member sealant could escape or improperly fill the area. Further, newly applied sealant might be forced out as more sealant is applied in the corner. The independently activated nozzle and wiper pair of the present invention cooperate to mold and form corner seals which are cleaner and better sealed avoiding a cold joint and eliminating the need to hand finish the assembled unit. At the corner area the wiper remains in position to cover the open edge, while the nozzle advances to fill the adjoining edge. Once the corner area is filled, the wiper returns to position following and wiping the extrusion from the nozzle.

The nozzle and wiper blocks will advantageously be adjustable to accommodate a variety of widths of substrates as well as to accommodate differing distances between the substrates and may optionally include a surface which has a low surface tension. By providing surfaces on both blocks with a low surface tension, the sealant or fill material, as it is applied and smoothed by the blocks, will not significantly adhere to the nozzle and wiper blocks, and therefore, will not impede the smoothing operation. To complement the low friction surface, the nozzle and wiper blocks may be heated to a point above the melting point of the sealant/fill to further enhance the application and smoothing operation and to provide a smooth surface finish. Heated wiper and nozzle elements also serve to prevent cooling while transfer to an adjacent edge and appropriate nozzle occurs. In particular this is important for the last corner joint, where a hot wiper element remains until the sealant extrusion is applied.

One of the more important features according to the present invention is that the method results in very efficient processing of insulated assemblies in an expedited manner. According to the method, movement of the extrusion nozzles or heads is kept to an absolute minimum and this is partly achieved by advancing the substrate of the insulated assembly to be treated, relative to the nozzles. Once a side has been treated, simple repositioning of the nozzles and plates can be achieved to facilitate sealant of the remaining sides followed by reconfiguration of the elements to an initial starting position once the entire substrate or assembly has been treated with sealant.

Advantageously, the cornering achieved in the method according to the present invention permits the corners to be molded and therefore continuous with the sides of the assembly. This facilitates the manufacture of dependable and energy efficient assemblies and is particularly effective to prevent the formation of unfilled areas or "air pockets" in the perimeter.

A further advantage of the apparatus of the present invention results from the use of position sensors both in association with the conveyor, as well as with the travelling head. As a result, assemblies of varying sizes may pass through the apparatus without need for resetting or other alterations.

In an alternate embodiment, the method may be practiced using irregularly shaped substrate profiles. Further, the method may be practiced to manufacture sliding doors, wall panels, etc.

Having thus described the invention, reference will now be made to the accompanying drawings illustrating preferred embodiments.

DETAILED DESCRIPTION OF THE PREFERRED EMBODIMENTS

Figure 1:
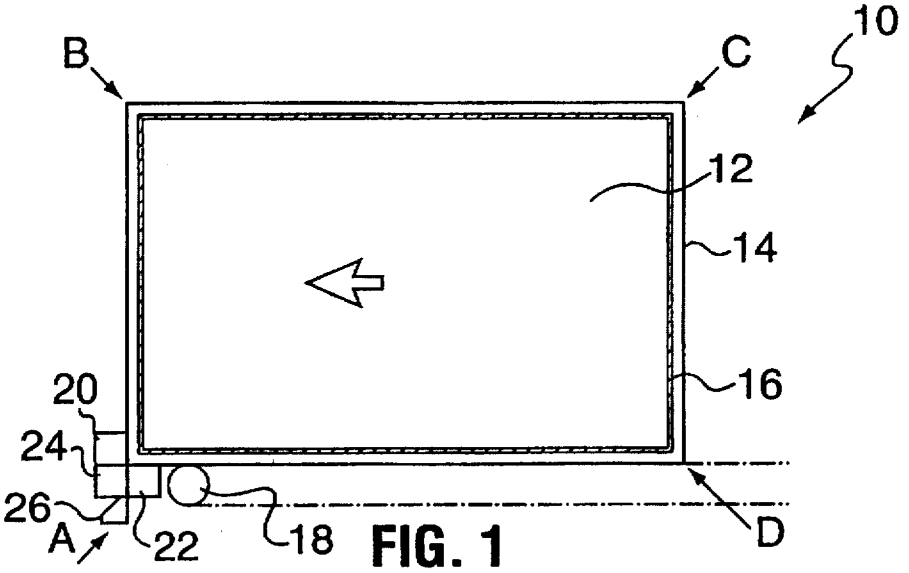
FIG. 1 is a top plan schematic view of an insulated glass assembly and the sealant applying members in an initial start position.

Referring now to the drawings, and more particularly FIGS. 1 to 12 which schematically illustrate the application procedure. FIG. 1, shows a top plan view of a first stage of the application procedure. The substrate assembly, globally denoted by FIG. 10, includes a pair of spaced-apart glass substrates. Only one of the substrates, 12, is shown in the plan view. However, it will be readily appreciated by those skilled that insulated assemblies are well known and include two or more spaced-apart substrates. The procedure described hereinafter may be performed on an assembly or on a single substrate onto which is added a second substrate in a downstream operation.

Substrate 12 includes a perimeter 14 and a spacer member 16 spaced inwardly from the perimeter and continuous thereabout. The spacer 16 may comprise any suitable material such as polysilicones, PET, metal, as well as other materials.

The assembly 10 is positioned on a transfer apparatus, an example of which is a conveyor table. This is shown in schematic illustration and is denoted by numeral 18 in FIG. 1.

Turning now to greater detail with respect to the application procedure, numerals 20 and 22 denote the sealant injection members for applying the sealant between the substrates and about the perimeter of the assembly 10. Suitable devices for applying the sealant include extrusion heads, well known in the art, or any other suitable apparatus for achieving this purpose.

For concerted operation with extrusion heads 20 and 22, there is included a pair of wiping or smoothing members 24 and 26 which cooperate with heads 20 and 22. The heads 20, 22 and members 24, 26 are independently slidable relative to one another both in the lateral and longitudinal directions relative to the assembly 10.

As is illustrated in FIG. 1, all of the elements 20 through 26 are grouped in a configuration such that the extrusion heads 20 and 22 are positioned on opposite sides of the corner A of the assembly 10. Initially, wiping or smoothing members 24 and 26 are positioned in a collinear manner with head 20. This configuration represents the "start" position.

Referring in greater detail to the wiper members 24 and 26, these members primarily function to provide a smoothing surface and a confining area within which sealant may be applied. The disposition of the spacer 16 relative to the perimeter 14, provides an area within which the sealant is applied. By providing the smoothing or wiping members 24 and 26, there is created a confined area between the spacer 16, the inner surfaces of the substrates, and a respective wiper member 24 or 26. Accordingly, as an extrusion head or nozzle 20 or 22 applies sealant material about the perimeter, a defined and contained area is created and filled with sealant, particularly as seen in the injection molded corners and subsequently smoothed by the wiper member 24 or 26.

Figure 2:
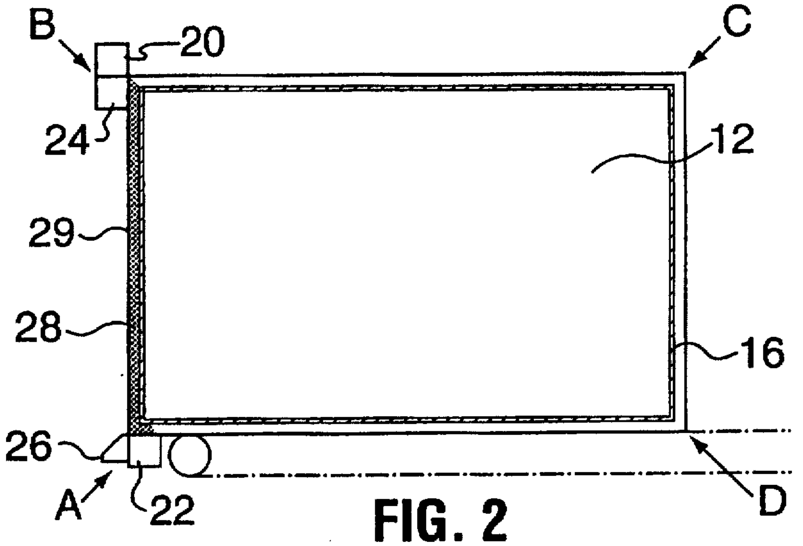
FIG. 2 is a view similar to FIG. 1 illustrating the disposition of the sealant applying members after a first side of the assembly has been treated.

In FIG. 2, elements 20 through 26 are shown subsequent to application of the sealant 28 to a first side 29. As illustrated, the transverse side 29 of the assembly is filled with sealant material 28. The extrusion head 20 and wiper member 24 have been advanced from the start position of FIG. 1 at corner A, to corner B of assembly 10. The extrusion head 20 and wiping member 24 are disposed in a collinear relationship and parallel to the transverse side of the assembly 10. Wiper member 26, has simultaneously moved to a collinear position with extrusion head 22, at corner A of the assembly 10. From the start position, extrusion head 22 has deposited sealant material 28, to lateral side 38 molding the corner in cooperation with extrusion head 20 partially beyond the corner A of the assembly 10. Extrusion head 22 and wiper member 26 maintain this molded corner at an extrusion temperature until further application of sealant material.

Figure 3:
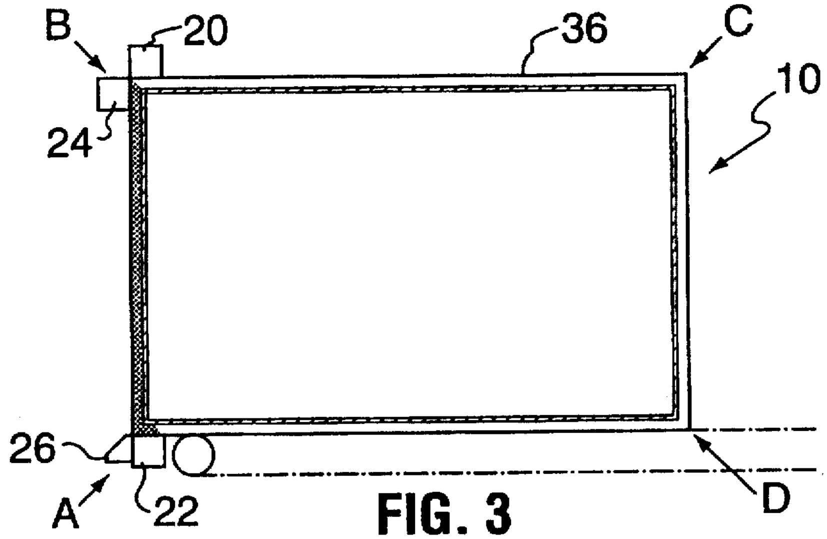
FIG. 3 is a subsequent view illustrating the disposition of the elements in a repositioned arrangement prior to the treatment of additional sides of the assembly.

FIG. 3 illustrates the next sequential operation in the process where head 20 has moved from a collinear position relative to wiper member 24 to a non-linear position where the same is positioned to apply sealant material along one of the lateral sides 36 of the assembly 10. As illustrated, the extrusion head 20 is positioned on side 36 of the assembly and the wiper 24 remains at the adjoining edge 29. In this position the corner area is closed so that sealant material can be injected and molded to a square corner without pushing material away from the newly applied transverse side, or leaving the open corner area unfilled. Once positioned about this corner, the sealant 28 can be injected as shown in FIG.

4. For cornering operations hereinafter, a similar procedure is followed using the respective extrusion head and wiper member.

Figure 4:
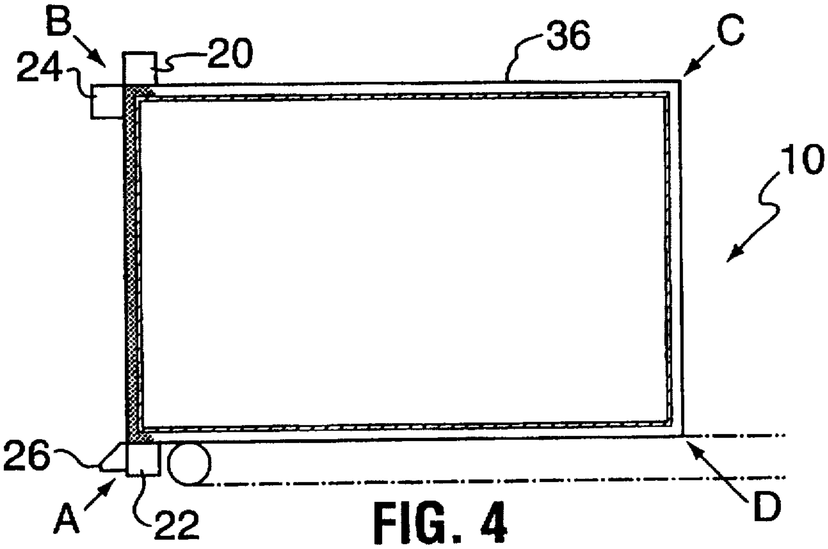
FIG. 4 is a sequential view illustrating the disposition of the elements molding and prefilling the corner prior to the onset of application of the sealant to the sides of the assembly.

Referring to FIG. 4, extrusion head 20 has applied at least some sealant material 28 about the corner and is positioned to apply the sealant material 28 along the entire length of lateral side 36.

Figure 5:
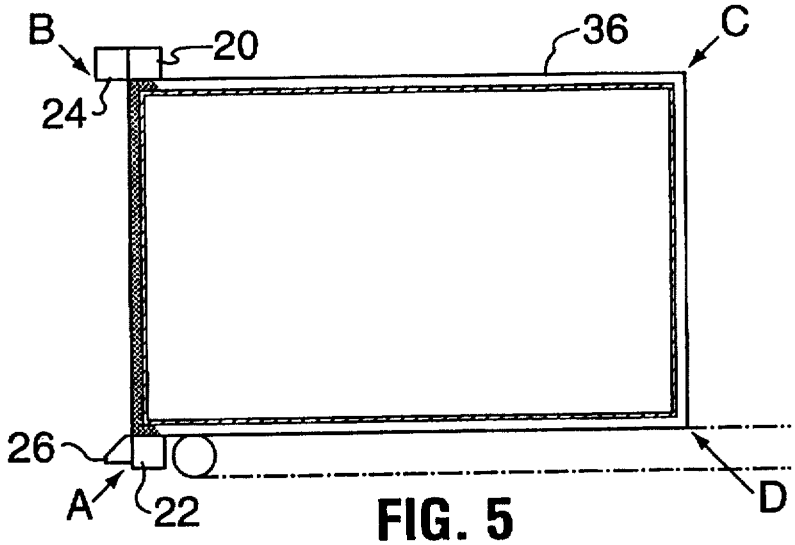
FIG. 5 is a sequential view illustrating the position of the elements following the wiping action to form a smooth and precise corner prior to the onset of the application of the sealant.

FIG. 5 illustrates the disposition of the wiper member 24 as having moved into position in a wiping action to form a smooth and precise corner, and is not in collinear relation with head 20. Both extrusion heads 20 and 22 are in position to apply sealant to sides 36 and 38 as the assembly 10 is advanced. In a preferred form, the assembly 10 is advanced on the conveyor 18 such that the substrate is moved relative to elements 20 through 26. Although, it will be readily appreciated that the assembly 10 may be non-movable and the members 20 through 26 may be moved relative to the assembly 10.

Figure 6:
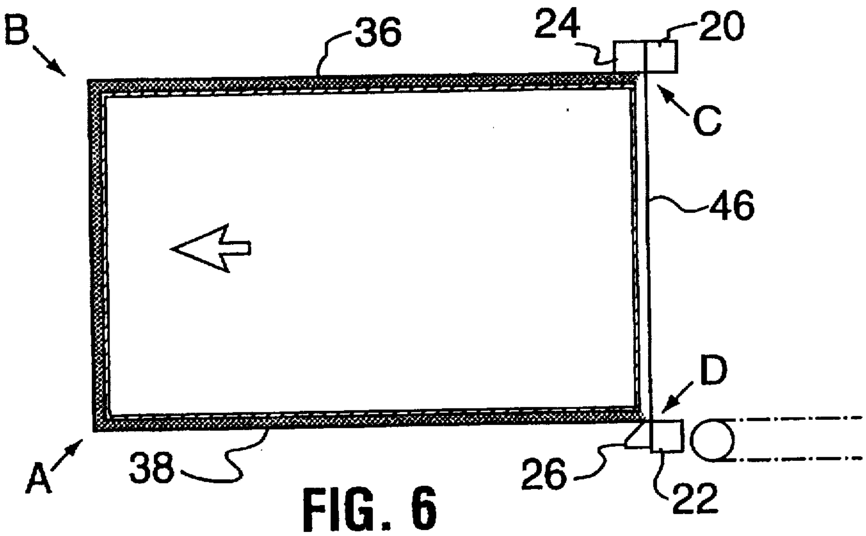
FIG. 6 is a sequential view illustrating the disposition of the elements subsequent to the application of the sealant to the sides.

FIG. 6 illustrates the disposition of the elements 20 through 26 subsequent to sealant application of the lateral sides 36 and 38. With specific reference to members 20 and 24, application of the sealant material 28 has been completed along lateral side 36 and the members 20 and 24 now reside at corner C. Similarly, elements 22 and 26 have applied sealant material along the entire length of lateral side 38 of the assembly 10. Wiper 26 remains in contact with the end of the applied sealant 28 at corner D to prevent cooling before the final corner joint is made.

Figure 7:
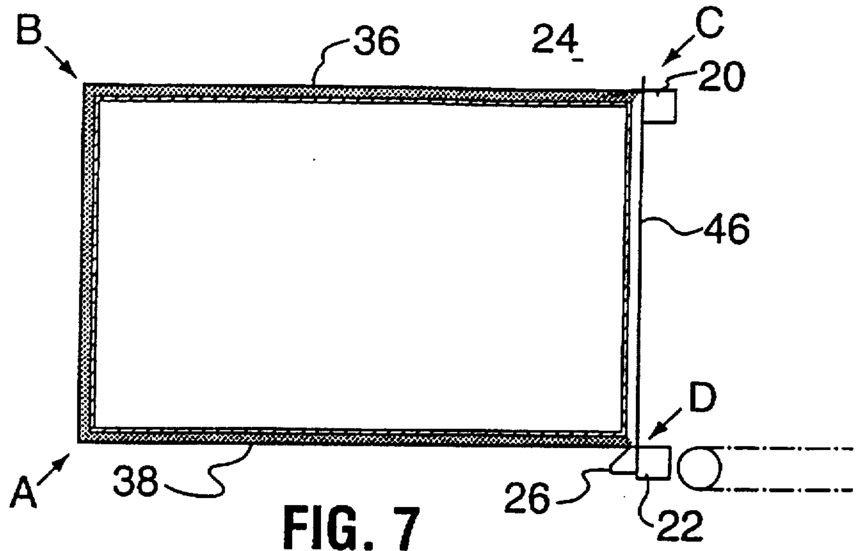
FIG. 7 is a sequential view illustrating the repositioning of the elements prior to the onset of the application of the sealant to the final side.

Turning to FIG. 7, as illustrated, head 20 is advanced about the corner C of the assembly 10 such that the head 20 and wiper member 24 are on opposite sides in position to mold the corner.

Figure 8:
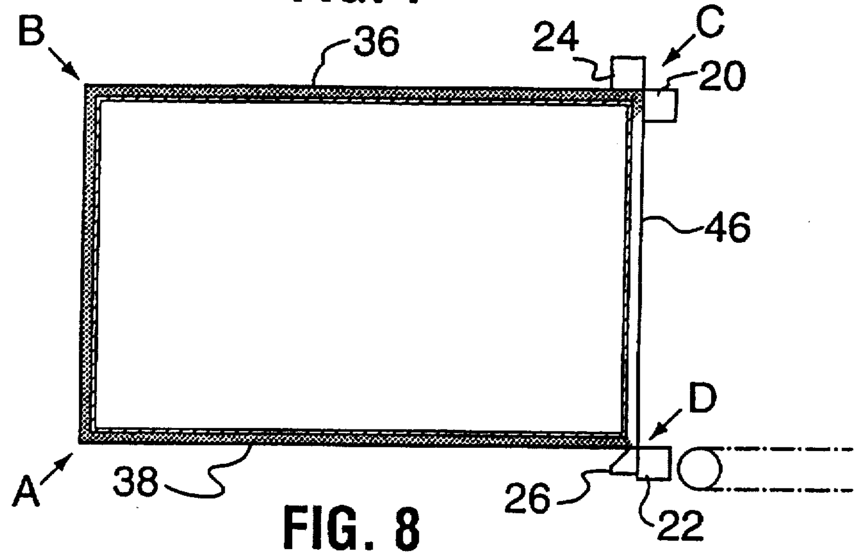
FIG. 8 is a sequential view illustrating the disposition of the elements molding and prefilling the corner prior to the application of the sealant to the final side.

FIG. 8 illustrates schematically the following position of the head 20 about the lateral side 36 of assembly 10 as a partial amount of sealant is applied thereto.

Figure 9:
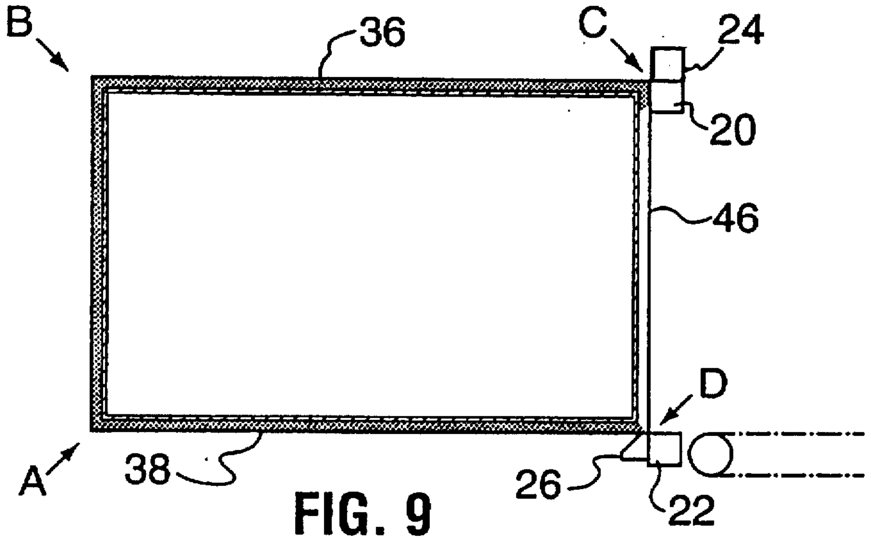
FIG. 9 is a sequential view illustrating the position of the elements following the wiping action to form a smooth and precise corner prior to application of sealant to the final side.

FIG. 9 illustrates the following procedure where wiper member 24 assumes a collinear position with head 20, having through wiping action formed a smooth and precise corner, wiping all applied sealant material 28.

Figure 10:
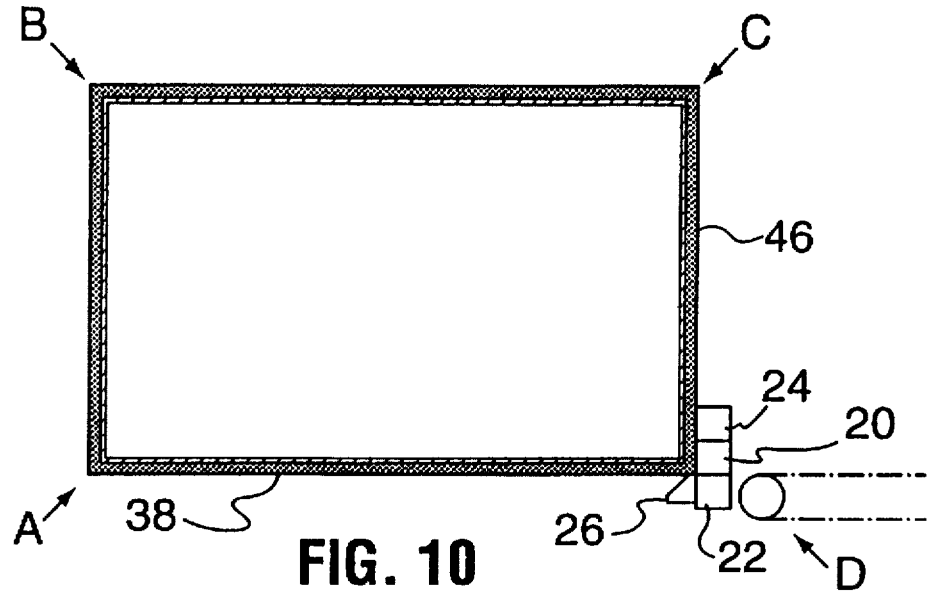
FIG. 10 is a sequential view illustrating the disposition of the elements at the terminal end of the substrate.

Turning to FIG. 10, shown is the disposition of the members 20 through 26 as configured at the terminal corner D of the assembly 10. In the arrangement shown, extrusion heads 20 and 22, as well as wiper member 24, all assume a collinear relationship and remain parallel and coplanar relative to transverse side 46. Similarly, head 22 relative to wiper member 26 are in a collinear relationship and parallel with lateral side 38. Wiper member 26 remains in position in contact with the sealant material 28 at extrusion temperature until the final corner joint has been made. In finishing action wiper member 24 wipes sealant material against wiper member 26 leaving a clean final corner D.

Figure 11:
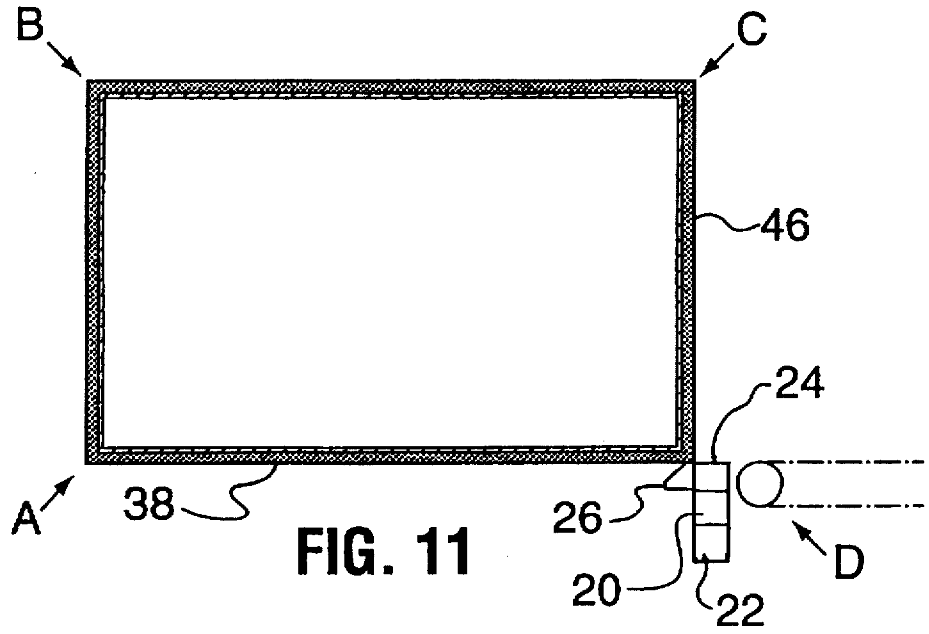
FIG. 11 is a sequential view illustrating the disposition of the elements at the terminal end of the insulated assembly in final wiping action of the wiper elements prior to removal of the assembly from the applicator station.

Turning to FIG. 11, shown is a first stage which signifies the beginning of the final reconfiguration of the members 20 through 26. At this point, sealant has been applied completely about the perimeter of the assembly and the elements are positioned for reconfiguration.

Conveniently, member 26 may include a fluid dispenser (not shown) for ensuring that any strings or hairs pulled from the sealant 28 are forced back into contact with the perimeter to prevent marring the surface of the substrate(s) which would require further cleaning. The source of fluid may be a pressurized gas jet or water, etc.

Figure 12:
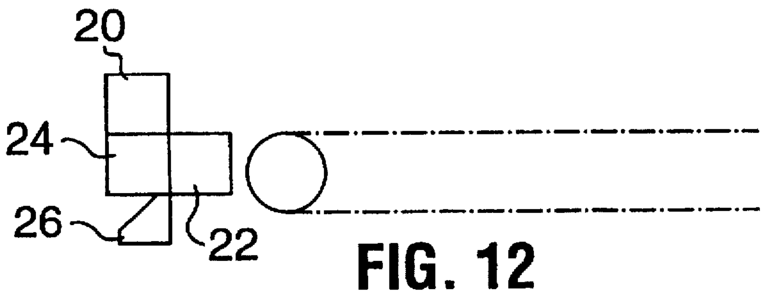
FIG. 12 is sequential view illustrating the reconfiguration of the elements prior to the onset of the application procedure from the start position.

FIG. 12 illustrates the reconfiguration of elements 20 through 26 to the "start" position ready for application of sealant to a next assembly 10 (not shown).

It can be seen from the operation illustrated in FIGS. 1 to 12 that the nozzle and wiper assembly 20, 24 applies sealant to three sides of the glass assembly 10 be advancing and returning on a linear path, while the nozzle and wiper assembly 22, 26 applies sealant to the remaining side as the glass assembly 10 is advanced. Accordingly assembly 20, 24 is termed the travelling applicator head, and assembly 22, 26 the stationary applicator head.

It will be appreciated that all of the steps as set forth herein will be of a timed or position triggered, and therefore, sequential form suitable for automated or semi-automated operation. To this end, various optical sensors, switches and other mechanical devices may be employed to assist in the accurate sequencing of the operations through a central controller.

Figure 13:
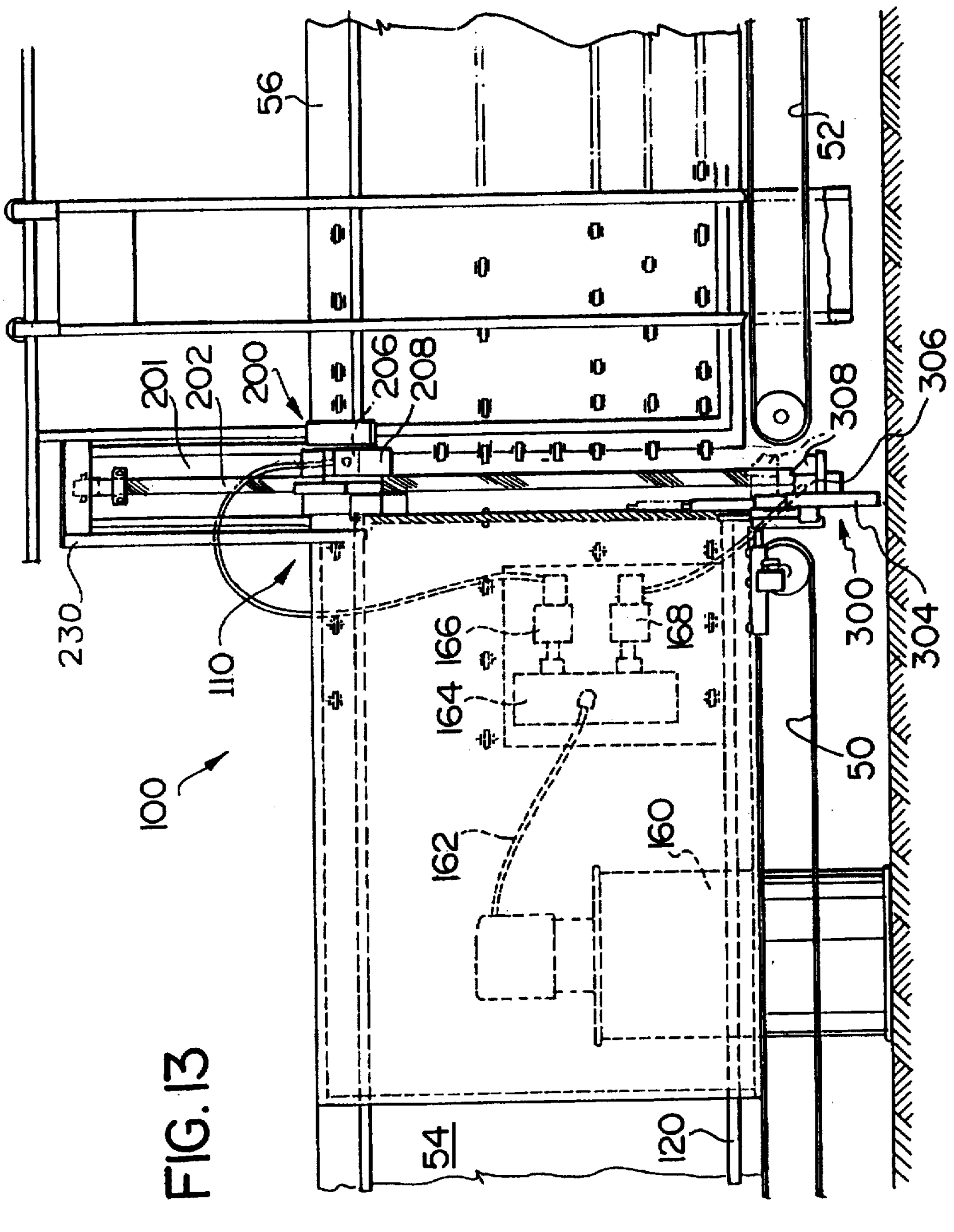
FIG. 13 is a partial front view of a preferred embodiment of the apparatus according to the present invention.

In FIG. 13 the apparatus for applying sealant according to the method of the present invention is illustrated in greater detail. The apparatus indicated generally as 100, includes an infeed conveyor 50 and an outfeed conveyor 52, which are preferably belts oriented to transfer the assemblies in a nearly vertical orientation, as this is the more stable orientation for glass. Supports 54 and 56 also nearly vertical include casters or other suitable guides to support the assemblies. In addition, the conveyors are preferably provided with position sensors 53 (seen clearly in FIG. 17) to detect the presence of a glass assembly and place it correctly in the application station, indicated generally as 110. Advantageously the conveyors may be driven separately or in unison allowing assemblies to be run closer together in the production line.

The application station 110 includes two applicator heads to apply sealant according to the method of the present invention. A travelling applicator head 200 is supported on a traveller 204 movable on a linear, preferably nearly vertical path on a track 201 supported on main vertical beam 230, and driven by a belt 202. The travelling head 200 also includes a cooperating nozzle member 206 and a wiper member 208 which travel with the travelling head 200 as part of the assembly, but are individually supported on the traveller 204 and slidably movable in both the x and y reference of the glass pane relative to each other by, for example, pneumatic cylinders.

A stationary head 300 is supported by an arm 304 which is secured to the main beam assembly 230 of the apparatus 100. The head 300 includes a cooperating nozzle member 306 and wiper member 308 which are movable on the arm 304 utilizing pneumatic cylinders, both the nozzle member 306 and wiper member 308 can be raised together from an inoperative position allowing the assembly to pass through the applicator station 110, to an operative position (shown in phantom) for applying sealant to the assembly. The nozzle member 306 and wiper member 308 are also independently movable in a vertical axis relative to each other by, for example pneumatic cylinders.

Material feed of the sealant material is provided to travelling head 200 and stationary head 300. Preferably, for a thermoplastic sealant, a supply 160 of sealant material is held under elevated head and pressure conditions, the heated sealant material is transferred in a heated conduit 162 to a regulator 164 where the flow is distributed under pressure to separate pumps 166, 168. Preferably the pumps 166, 168 are positive pressure pumps controlled by independent servomotors which match the pressure to the changing speed of travel of the travelling head and the advance of the assembly on the conveyors 54, 56. In this way a uniform application of sealant can be achieved.

Figure 14:
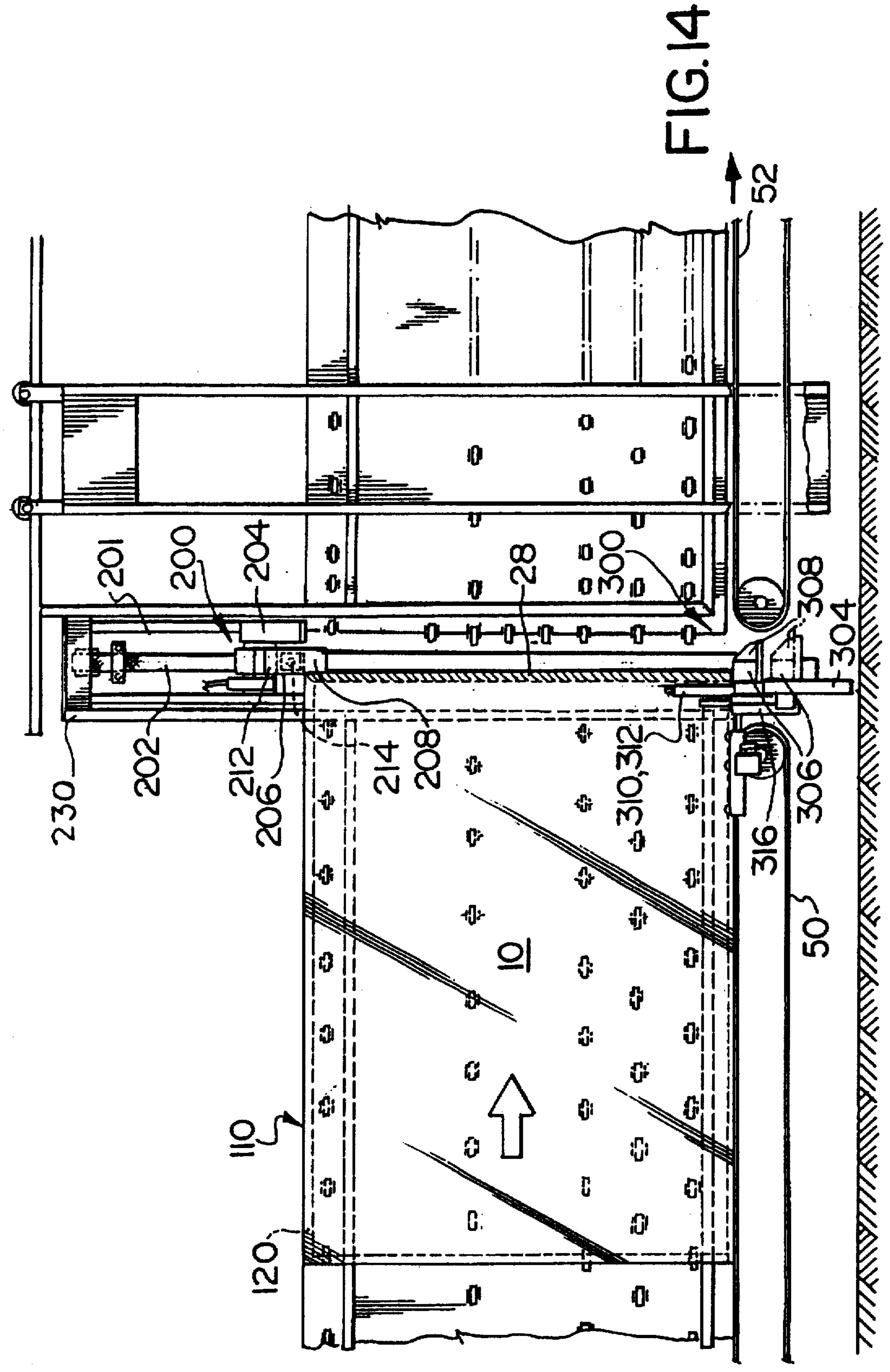
FIG. 14 is a partial front view illustrating the application station in greater detail.

FIG. 14 illustrates the application station 110 showing a glass assembly 10 in position. Sealant 28 has been applied to a leading transverse edge by the travelling head 200. The stationary head 300 has been raised by pneumatic cylinders 310, 312 and support platforms 314, 316 (see more clearly in FIG. 17) into an operative position at the lower lateral edge of the assembly 10 with the nozzle member 306 and wiper member 308 in a linear configuration. To apply sealant to the lateral sides, the assembly 10 will be transferred from the infeed conveyor 50 to the outfeed conveyor 52 across the application station 110 until the trailing transverse edge is aligned with the travelling head 200.

Figure 15:
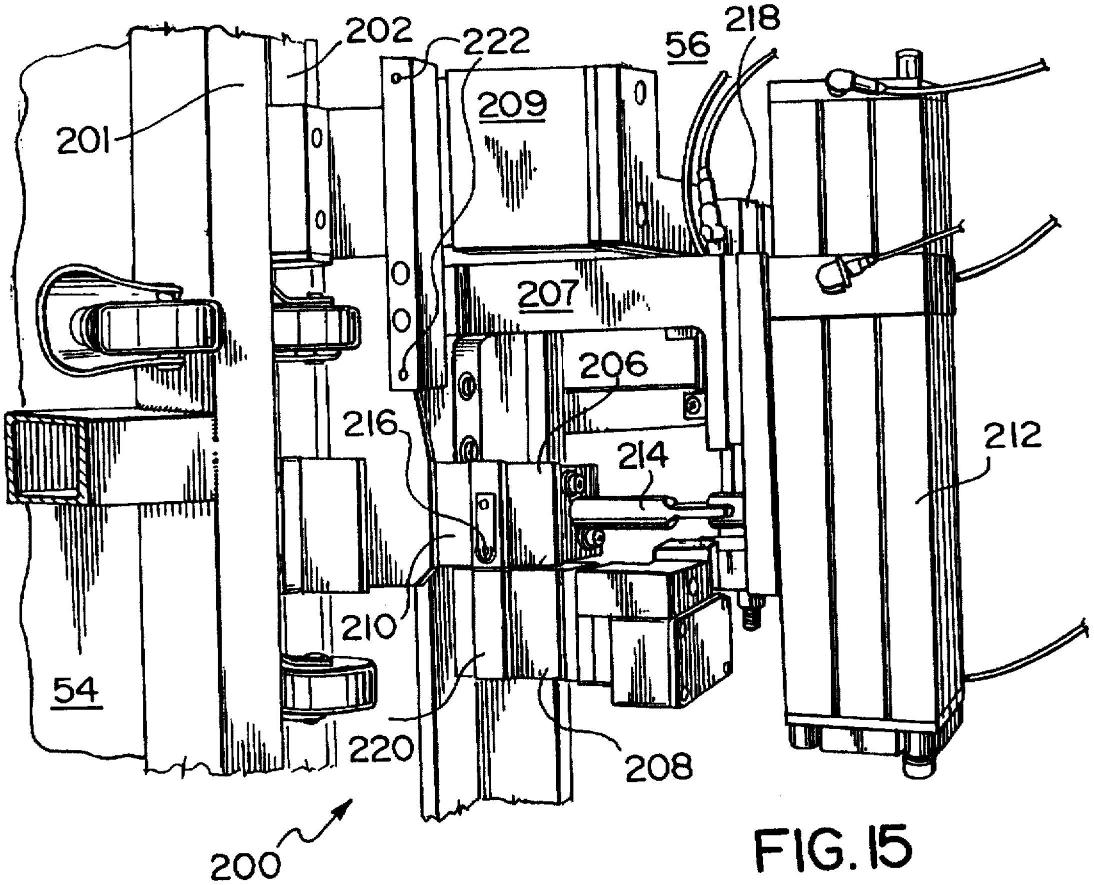
FIG. 15 is a partial isometric view illustrating the travelling applicator head.

In FIG. 15, the travelling head 200 can be seen in greater detail. The head 200 comprises a nozzle member 206 and a wiper member 208 secured on independently movable support arms 207, 209 to a traveller 204, which is movable on a track 201 driven by an endless belt 202. The nozzle member 206 is fixed to a heated feed manifold 210 through which sealant 28 is supplied. A support arm 207 secured to the nozzle 206 supports a rotary actuator 212. The rotary actuator 212 rotates a valve shaft 214 having an internal port for selectively directing flow of sealant 28 to the desired orifice 216 of the nozzle 206. The nozzle construction is slidably movable on the head assembly 200 in both the x and y references by, for example, pneumatic cylinders. A wiper member 208 also includes means such as pneumatic cylinders for enabling independent movement in both the x and y references. An important aspect of the applicator head 200 is the independent sliding movement of the nozzle member 206 relative to the wiper member 208. In this way the two elements can be reconfigured to apply sealant 28 in three directions as well as for molding the corners, with a minimum movement, and without lifting the elements from the glass assembly 10. Sliding movement is accomplished by the use of two pneumatic cylinders at right angles securing the support arm 207 to the traveller 204 (not shown) for the nozzle member 206. Wiper member 208 includes cylinder 218 for vertical movement and an additional cylinder (not shown) for lateral movement which secures the support arm 209 to the traveller 204.

Figure 16:
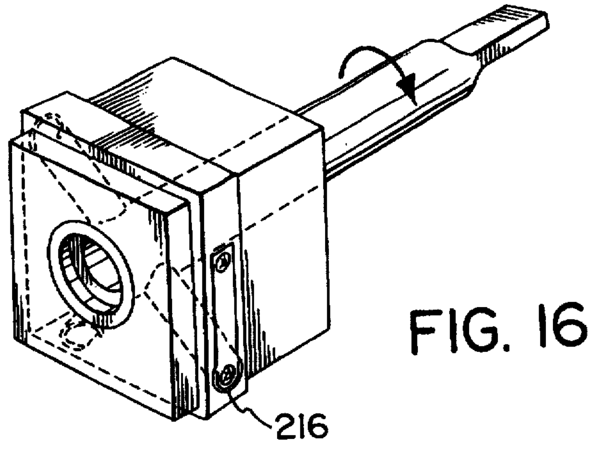
FIG. 16 is a detailed isometric view of the nozzle member of the travelling applicator head of FIG. 15.

The travelling head 200 must apply sealant 28 in three orientations. This is done by providing three orifices 216 as seen in FIG. 16 on the nozzle 206 in the three different orientations. A central bore in the nozzle member contains a rotating valve shaft 214 having a port for directing the flow of sealant 28 to the appropriate orifice 216. A preferred orifice 216 has been found to be a C-shape as illustrated. This shape permits the area between the spacer and the perimeter of the two glass plates to be filled substantially completely without leaving air pockets, and thus ensuring good sealing contact. Rotary actuator 212 coordinates rotation of the shaft 214 with movement of the nozzle member 206. The nozzle member 206 is never rotated and consequently not lifted from the glass assembly 10. Similarly the wiper member 208 also has a wiper profile 220 on three faces in three orientations. The travelling head 200 further includes position sensors which serve to indicate the edge of the glass assembly as the head approaches for accurately forming the corner and re-positioning for the next side.

Figure 17:
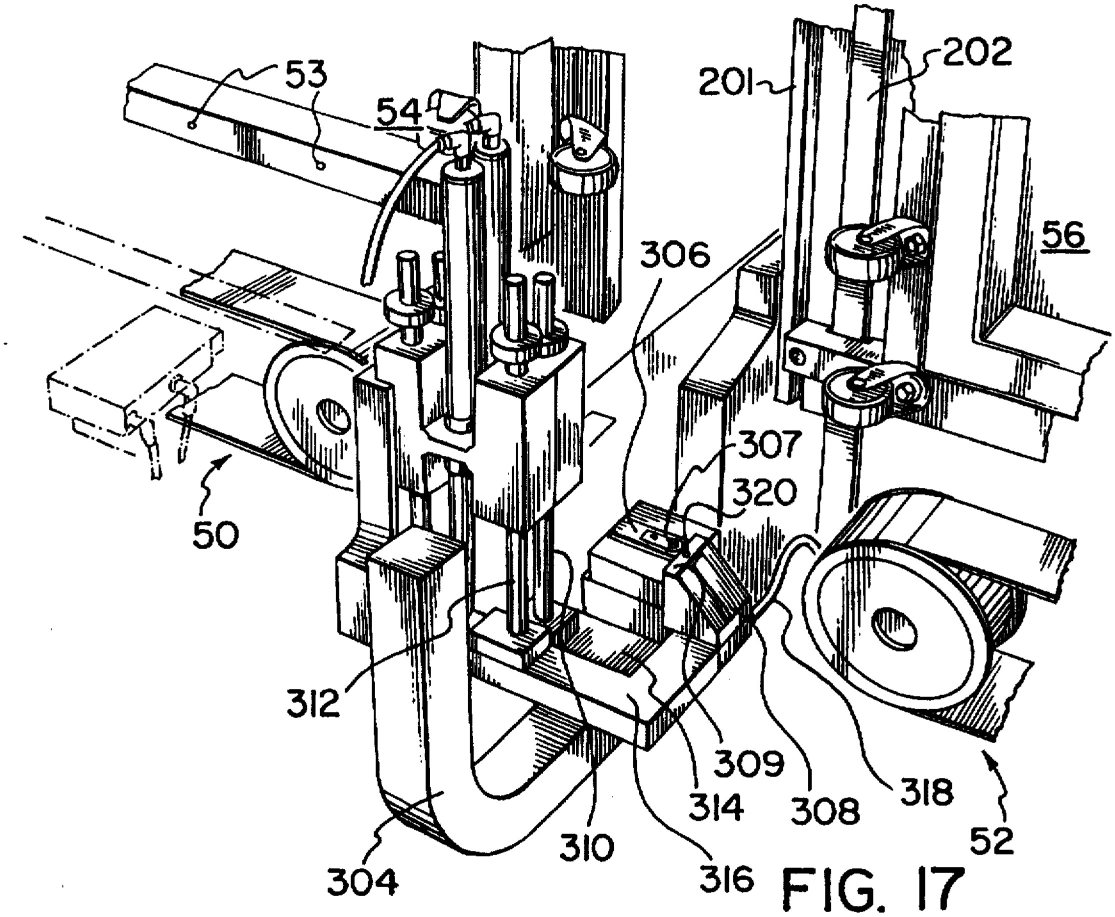
FIG. 17 is a partial isometric view illustrating the stationary applicator head.

FIG. 17 illustrates the stationary head 300 in greater detail. The stationary applicator head 300 is movable vertically from an inoperative position to an operative position at the edge of the glass assembly 10 by pneumatic cylinders 310, 312. A separate support platform 314, 316 is provided for the nozzle member 306 and the wiper member 308 so that they can be raised and lowered independently or simultaneously. A small conduit 318 directs a fluid stream such as air, other gases or liquid from the aperture 320 in the wiper member 308 for directing any hair or string of sealant material 28 back onto the applied sealant of the glass assembly 10 as the finished assembly 10 is separated from the applicator heads 200, 300 and advanced out of the application station 110.

In operation a glass assembly 10 is advanced into the application station 110 and positioned with the leading edge 29 in place to receive the nozzle 206 of the travelling head 200. The stationary nozzle 306 and the movable nozzle 206 with wiper member 208 form an L configuration at the first corner A. While the corner A is thus closed, the stationary nozzle 306 injects sealant 28 into the corner area. The travelling head 200 is then advanced up a first transverse side 29 extruding sealant 28 to seal the edge 29. The head motion stops with the wiper member 208 flush with the edge 36 of the assembly. The rotary actuator 212 rotates the shaft 214 for application from the bottom face of the nozzle 206, and the nozzle member 206 shuttles laterally relative to the wiper member 208 to inject sealant 28 into the corner B. The wiper member 208 moves up to join the nozzle 206 in a linear configuration wiping and smoothing the edge and forming a smooth corner. The wiper member 308 also rises to join the nozzle member 306 of the stationary head 300 in a linear configuration. The assembly 10 is advanced by the conveyors 50,52 and sealant 28 is simultaneously applied to both lateral sides 36, 38 by the two nozzle members 206, 306. At corner C, the movable nozzle 206 again shuttles, this time downward as the rotary actuator 212 turns to select the orifice adjacent the trailing lateral edge 46. The corner C is molded, and the wiper member 208 is advanced wiping and smoothing the edge to a vertical linear configuration above the nozzle member 206. The travelling head 200 travels downward as the nozzle 206 injects sealant 28 into the trailing lateral side 46. The stationary nozzle member 306 lowers out of position, and the movable nozzle 206 meets the stationary wiper 308 to form the last corner D. The wiper 208 wipes against the wiper 308 wiping and smoothing the edge 46 forming a clean corner. The wiper 308 maintains contact wiping and smoothing the corner D as the finished assembly 10 is advanced out of the application station 110. An air stream is directed at corner D forcing any hairs or strings of sealant material 128 against the applied sealant on the perimeter of the assembly. The movable nozzle 206 and wiper member 208 reconfigure for the next assembly.

The independent movement of the nozzle 206 and wiper members 208 allows them to assume different configurations for the direction of travel, always advancing the nozzle 206 before the wiper 208 in the direction of travel. At corners the nozzle 206 and wiper 208 no longer assume a linear configuration. In order to effectively close off the open area to be filled the nozzle 206 advances over the corner and the wiper 208 remains at the end of the filled side. The two members are in diagonal relationship at this point in order to fill and mold a square corner. The wiper 208 then joins the nozzle member 206 in linear configuration for application of sealant 28 to the next side.

The nozzle and wiper members 206, 208, 306, 308 are preferably heated to a point above the melting point of the sealant 28 to ensure adequate smoothing without substantial collection of sealant material during the application process. Further, the wiper members may be composed of a low surface tension material or may be augmented with such a material to provide a non-sticking surface relative to the sealant material.

I claim:

1. An applicator head for injecting sealant material into three adjacent sides of the perimeter of an insulated glass assembly comprising:

a traveller adapted for movement in a reversible linear path;

a nozzle member for injecting the sealant material secured on said traveller to be movable in both lateral and transverse directions; and a wiper member adjacent the nozzle for smoothing the applied sealant material around the perimeter of the assembly separately secured on said traveller for independent movement, relative to said nozzle member in both a lateral direction, parallel to the nozzle direction and a transverse direction in the plane of the substrate or glass assembly and perpendicularly to the nozzle direction.

2. An applicator head as described in claim 1, for injecting sealant material into multiple sides of the perimeter of an insulated glass assembly further comprising:

a plurality of selectable orifices in said nozzle member differently oriented corresponding to the orientation of the perimeter edges to be sealed and actuator means for selectively directing flow of sealant material;

a plurality of selectable wiper profiles in said wiper member differently oriented to meet with the perimeter edges to be sealed; and whereby said cooperating nozzle member and wiper member may apply sealant to multiple perimeter edges without rotation.

3. An applicator as described in claim 2, wherein each selectable orifice has a C-shape oriented with open ends of the C aligned with an open edge of the perimeter to be sealed.

4. An applicator head as described in claim 2, wherein the nozzle member and wiper member are independently movable from a vertical linear configuration, for application to a first transverse side, to a diagonally adjacent configuration, for molding corners, to a horizontal linear configuration, for application to a lateral side, to an opposite vertical configuration, for application to a second transverse side and reconfigured to the original vertical linear configuration for the next assembly.

5. An applicator head as described in claim 4, wherein said applicator head further includes position sensor means for determining the transverse dimension of the assembly.

6. An apparatus for applying sealant material to the perimeter of a substrate or an insulated glass assembly comprising:

an infeed conveyor for advancing an assembly into an application station;

said application station comprising:

a travelling applicator head movable on a linear path including a nozzle member for injecting sealant material into three adjacent sides of the perimeter of said assembly, and a cooperating wiper member adjacent the nozzle for smoothing the applied sealant about the perimeter of the assembly, said nozzle member and said wiper member each independently movable in relation to the other in both a transverse direction, in the plane of the substrate or glass assembly and perpendicular to the nozzle direction and in a lateral direction parallel to the nozzle direction, in order to assume different configurations of positions;

a stationary applicator head including a nozzle member for injecting sealant material into one side of the perimeter of said assembly and cooperating wiper member adjacent the nozzle, said nozzle member and said wiper member each independently movable in relation to the other between an operative position and an inoperative position; p1 material feed for independently supplying sealant material to each applicator head; and an outfeed conveyor for removing the finished assembly from the application station.

7. An apparatus as defined in claim 6, wherein said nozzle of said travelling head further includes an orifice on each of three adjacent faces oriented to meet the three perimeter edges of the assembly to be sealed, and a central port having a rotatable valve shaft for selecting the direction of flow.

8. An apparatus as defined in claim 7, wherein each orifice has a C-shape oriented with open ends of the C aligned with an open edge of the perimeter to be sealed.

9. An apparatus as defined in claim 7, wherein said wiper member further includes a wiper profile on each of three adjacent faces oriented to meet the three perimeter edges of the assembly to be sealed.

10. An apparatus as defined in claim 9, wherein the nozzle and wiper members of said travelling head and of said stationary head are heated above the melting temperature of the sealant material.

11. An apparatus as defined in claim 10, wherein said outfeed conveyor includes position sensor means to determine the lateral dimension of glass assembly for automated operation.

12. An apparatus as defined in claim 11, wherein position sensor means are provided on said travelling head to determine the transverse dimension of the assembly for automated operation.

13. An apparatus as defined in claim 12, wherein said travelling head travels on a track driven by an endless belt.

14. An apparatus as defined in claim 6, wherein said infeed and outfeed conveyors are adapted to support the glass assemblies in a nearly vertical position, and said travelling head is movable in a corresponding nearly vertical linear path.

15. An apparatus as defined in claim 14, wherein said infeed and outfeed conveyors are adapted to advance simultaneously or independently as selected by the operation.

16. An apparatus as defined in claim 6, wherein the material feed to each applicator head is supplied by individual pumps.

17. An apparatus as defined in claim 14, wherein said pumps are controlled by servo motors responsive to the relative speed of travel of the applicator heads and conveyors.

18. An apparatus as defined in claim 12, wherein said stationary head includes a fluid stream to cut any string of excess sealant material which may be formed as the finished assembly is separated from the application station at the end of application process.

* * * * *